Dec. 24, 1963   C. F. SHAFFER   3,115,101
PASSENGER CARS IN TRANSPORTATION SYSTEMS
Filed March 7, 1960
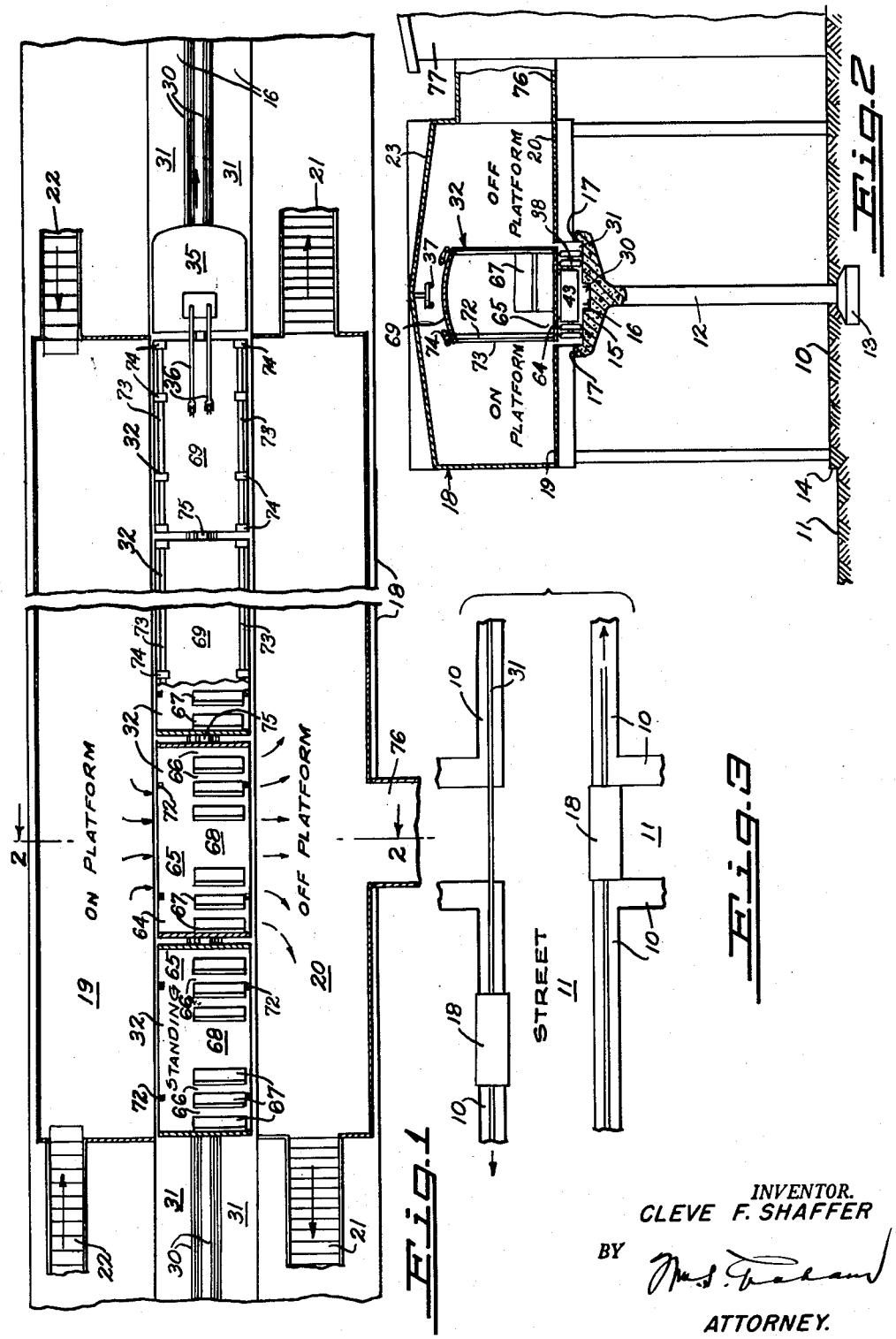
INVENTOR.
CLEVE F. SHAFFER
BY
ATTORNEY.

United States Patent Office 3,115,101
Patented Dec. 24, 1963

3,115,101
PASSENGER CARS IN TRANSPORTATION SYSTEMS
Cleve F. Shaffer, 710 Taylor St., San Francisco, Calif.
Filed Mar. 7, 1960, Ser. No. 13,329
3 Claims. (Cl. 105—344)

This invention relates to passenger cars in transportation systems and particularly relates to such passenger car facilities of the type adaptable for transportation systems in city areas of congested traffic.

As is well known an urgent problem of mass transportation is being presently encountered in cities and particularly the congested so-called downtown areas notably because of the increase of automobile traffic, parking of automobiles at curb lines, increase of pedestrian traffic in concentrated business areas, the necessity for "stop and go" signals at street crossings, and many other factors which delay and congest vehicle and pedestrian traffic at street level, including the present type of street-level transportation systems.

One of the difficulties in meeting the present transportation problem in congested areas is that the same heavy and expensive facilities are employed in the congested area as in the suburban and outlying areas of non-congested traffic, whereas the practical problems are substantially different. When these heavy and expensively operated transportation units are beyond the limit of the congested area, they are dispersed in all directions and are suitably adapted for transportation at relatively high speed and long distance travel in the outlying areas, for which purpose the passenger requires comfort over the long trip, as well as built-in comforts. These heavy transportation units require one or more operators, and propelling mechanism for each separate unit. When such transportation units are in a downtown congested area they are still just as large, heavy and complicated, and have all the same built-in capacities inherent in them for the long haul in the outlying non-congested areas, yet their progress in the congested areas is slowed to possibly 20% of their mechanical capacity for providing reasonably fast transportation. And their size which is necessitated by operational requirements for speed and comfort over the long haul merely adds to the congestion in the central downtown congested areas.

An object of the present invention is to provide a passenger car in a transportation system which is preferably elevated above the normal traffic level of streets in congested traffic areas, or optionally as a subway, and to provide passenger facilities for mass transportation in such congested traffic areas. Another object is to provide facilities in a transportation system for congested traffic areas in which a plurality of light-weight cars and a single motor unit may be connected in consolidated train units; to provide in such cars seating capacity coordinated with facility for entering and leaving such cars; to provide in a transportation system platforms cooperating with the passenger car units for loading and unloading passengers conveniently and expeditiously; and generally to improve upon transit systems in such congested areas.

With the foregoing and other objects in view, as will more fully be described in the following specification, one form in which the invention may be exemplified is set forth herein and illustrated in the accompanying drawing which is made a part hereof.

In the drawing:

FIG. 1 is a fragmentary diagrammatic plan view, partly in section, of facilities of a transportation system showing the passenger car of the invention;

FIG. 2 is a vertical lateral section of facilities of the transportation system on line 2—2 of FIG. 1, including platforms cooperating with the passenger cars of the invention;

FIG. 3 is a diagrammatic plan view of the relation of the transportation system to a sidewalk along a street.

Referring to the drawing in which like reference characters indicate corresponding parts in the several views, 10 indicates the usual pedestrian sidewalk and the ordinary street level 11. Extending upward from the sidewalk are relatively spaced supporting posts 12 of steel or concrete which may be footed on foundation 13. The supporting posts may be in alignment at any suitable position longitudinally of the street area, but since it is the desire and purpose to relieve congestion of the roadways of street areas, it is preferred that the supporting posts shall be in alignment substantially centrally longitudinally of the pedestrian sidewalk, as shown in the diagrammatic view of FIG. 3, though they may be aligned along the usual curbing 14 to prevent obstructing either the sidewalk or the street roadway.

At the upper end, the supporting posts 12 mount laterally extended arm portions 15 of a paved road bed or traction roadway 16 extending longitudinally and continuously from post to post for the length of the transit system. In this exemplification the traction roadway is free of the usual tracks upon which the cars of a transportation system usually travel, though any suitable type of roadway may be employed. These roadways have upraised abutments 17 longitudinally along the opposite sides thereof, providing therebetween the paved traction roadway upon which the transit vehicles may operate.

At suitably spaced convenient points along the roadway system are stations generally indicated 18 for boarding and discharge of passengers, a floor plan of which is best shown in FIG. 1. At these stations there is a platform on each of the opposite sides of the roadway 16, one of which is an "on" platform 19 for boarding the transit vehicles and the other at the opposite side of the roadway being an "off" platform 20 for discharge of passengers, each of said platforms having means for ingress and egress such as the usual steps or escalators indicated respectively 21, 22, the platforms of the stations being parallelly relatively spaced with the roadway therebetween. The "on" and "off" platforms 19 and 20 at stations have the level of the pedestrian surface thereof elevated from the plane of the traction roadway 16 sufficiently so that the floor levels of the transit vehicles or cars are substantially in a plane with the level of the platforms, as best shown in FIG. 3.

It is preferred that the roadway 16 as well as the station areas have an outer enclosing cover or housing generally indicated 23 preferably of relatively thin sheet metal, which may be made in removable sections or units so that in the event it should become necessary by accident, or need for repair of cars in transit, one or more of the passenger cars may be removed separately, being sufficiently light in weight to facilitate such removal as separate units by means of suitable derrick equipment.

If trackless roadway is employed instead of the usual tracks a guideway means may be provided in the roadway for guiding the cars with relation to the roadway 16, the side abutment 17 and station platforms 19, 20. Such guideway may comprise guide rails 30 which may be suitably engaged to center the cars in traction space 31.

Passenger carrying vehicles or cars 32 are provided in separate units and may be suitably coupled together to provide trains of predetermined length to meet varying demands for transportation during peak loads and light loads during the course of a day. A single separate motor unit 35 is provided, and as exemplified herein, is of the well-known electric motor type having a trolley pole 36 extending to a suitable source of electric power 37.

It is contemplated that the collection of fares and issuing of transfer coupons would be effected at point of entry to a station and not by the operator of the train. Nor would the operator be charged with guiding the train.

The passenger carrying cars and the motor unit run on rubber tired wheels 38 on the paved roadway 16 and are prevented from leaving the roadway by the abutments 17. The passenger transport cars 32 have a suitable supporting undercarriage or chassis, and axle structure, generally indicated 43, of any suitable mechanical structure and light in weight, upon which is mounted the floor 64 of the passenger cars.

A plurality of the passenger cars 32 may be coupled together in a transit unit in accordance with the demands of traffic at different hours of the day and in different areas of traffic, and such adjustment of facilities is readily accomplished by the small light passenger cars which are easily coupled and disconnected in a train.

The floor 64 of such passenger cars supports the super-structure of the cars. The floor is mounted in a plane upon the said under-carriage and chassis structure 43, such floor being of greater width than the undercarriage structure as is usual and best shown in FIG. 2. It is to be observed that the wheel assembly 38 and undercarriage structure 43 as an entirety is of sufficient height so that the floors of the passenger cars are substantially co-planar with the "on" and "off" platforms 19, 20. The floors of the cars are of suitable transverse width to provide a proper clearance of contact with such loading and unloading platforms, for which reason the path of travel of the cars is accurately and positively mechanically and uniformly aligned by the guide means rather than the uncertainties of personal steering, both with relation to the station platforms and the roadway abutments 17.

The floor of the car is divided into a vacant boarding and standing area generally indicated 65 and seating areas 66, which are longitudinally the length of the car. The boarding and standing area 65 is longitudinally along one side portion of the car floor which would be the entrance side adjacent to the "on" platform 19 at the station. This boarding and standing area preferably has a width of substantially one-third of the lateral transverse width of the car floor. The remainder of the width of the car floor area is the seating areas 66 occupying substantially two-thirds of the lateral transverse width of the car floor. In this seating area at one side portion of the car floor there are a plurality of seats 67 laterally transversely of the car floor, and the separate seats are parallelly spaced relatively between the forward and rearward ends of the floor of the car, these spaced seats being in spaced groups in a manner to provide an additional space between the groups of seats and thus provide an exit aisle 68 through which easy access is provided for passengers to pass from the entrance or boarding and standing area to the opposite discharge or exit side of the car without disturbing passengers in the seats facing such aisles, as shown in FIG. 1.

The opposite longitudinal sides of the car are normally free of permanent closure, and as shown by arrows in FIG. 1, the car may be boarded at any part of the length of the boarding side, and exit may be from any part of the opposite side, the passengers occupying the seats being able to pass directly from the seats to the open exit side of the car without returning to or again passing through the boarding and standing area 65 or through aisle 68.

The passenger cars are each preferably provided with an independent roof 69 for each car, though not necessarily so provided in areas of mild temperatures if the enclosing housing 23 is provided for the entire length of the transit system. Such a roof for the separate cars may be supported by spaced upright posts 72 at the opposite longitudinal sides of the floor member and extending to the roof.

To prevent the possibility of accident in transit, a suitable means is preferably provided for closing the longitudinal sides of passenger cars when they are in motion of transit between stations 18. As herein exemplified, such means comprises a plurality of drop roll-up curtains 73 mounted on suitable rollers of suitable end-to-end length longitudinally along the opposite edges of the roof of the cars, these curtains being separately operable for up and down movement by motors 74 which in turn are operated by the train operator in a suitable electric circuit, from the cab of the motor unit.

A coupling means 75 of any suitable type is provided by which the respective passenger cars and motor unit may be coupled into trains of length and number of cars determined to be advisable for varying demands of traffic conditions.

As a further advantage of the system there is shown a pathway 76 which may lead from a station into an adjoining building 77, if such access is desired, as shown in FIGS. 1 and 2.

In operation, the invention contemplates that the transportation system and the passenger cars as described would be employed only in areas where pedestrian and vehicle traffic is congested at the usual level of the sidewalk and streetway, and preferably extending in opposite directions on the opposite sides of the same street. The system would be relatively short, and relatively low speed of headway would be contemplated, such as 25 miles or less per hour, with stations spaced two to four city blocks apart for convenient access, permitting the use of equipment of relatively light weight and inexpensive cost, with relatively low cost of starting and stopping. Because of the short distance of travel and light weight of equipment, the trains may be run on a more frequent schedule than conventional present types of trains, street cars or buses. The provision for floors of cars to be at the level of platforms at stations coupled with the boarding of cars at an "on" side, and an exit from the cars at an "off" side through a spaced exit passageway as well as directly from the spaced seats, keeps the passengers flowing in one direction and greatly facilitates saving of time in the loading and unloading of passengers. To facilitate loading and unloading of passengers, the entire trains of a plurality of cars would preferably not be of greater length than the length of the platforms of the stations.

Having described the invention, what is claimed as new and patentable is:

1. In a transportation system, an elongated vehicle car having suitable running gear, a floor, a roof, and having open side walls extending along the opposite longitudinal sides of the car, the floor of said car having a boarding entrance extending substantially the entire length of one open longitudinal side thereof, and an exit at substantially the entire length of the opposite open longitudinal side thereof, a vacant boarding and standing area longitudinally along the entire length of said boarding entrance-side of the floor of the car, and transversely disposed seats in an area longiudinally of the opposite exit-side portion of the floor, the seats being in groups and the groups being relatively spaced to provide a free exit passageway between said groups of seats from the boarding and standing area to said opposite exit-side of the car, and the seats in said groups being relatively parallel and spaced providing a space between the seats from said standing area to the adjacent open exit-side of the car.

2. A vehicle car as set forth in claim 1, substantially the entire length of the side walls of the car having selectively raisable and lowerable curtains at the opposite sides of the car, whereby separate portions of the boarding and exit sides of the car may be selectively opened and closed, each of said curtains being of a width less than the entire longitudinal lengths of the open side of the car.

3. In a transportation system, the combination of a roadway for vehicles, a boarding on-platform on one side of the roadway, and an exit off-platform on the opposite side of the roadway, said roadway being at a lower level than the level of said platforms, and a vehicular car having suitable running gear for operation on said roadway, said car having a floor at an elevation substantially similar to the elevation of said platform, said car having an open boarding entrance substantially the entire length of one longitudinal side, and an exit-outlet substantially the entire length of the opposite longitudinal side thereof, the floor at both the boarding-entrance and the exit being at the same elevation as the said platforms, a vacant boarding and standing area longitudinally along the entire length of said boarding-entrance side of the floor of the car, and transversely disposed seats in an area longitudinally of the opposite side portion of the floor, the seats being in groups which are relatively spaced to provide a free exit passageway between said groups of seats from the boarding and standing area to said opposite exit side of the car, and the seats in each group being relatively parallelly spaced providing a space between the seats from the standing area to the adjacent open exit side of the car.

References Cited in the file of this patent

UNITED STATES PATENTS

| | | | |
|---|---|---|---|
| 496,232 | Schatz | Apr. 25, | 1893 |
| 530,999 | Mather | Dec. 18, | 1894 |
| 723,644 | Brill | Mar. 24, | 1903 |
| 1,033,540 | Clark | July 23, | 1912 |
| 1,593,213 | Hodges | July 20, | 1926 |
| 1,659,608 | Miller | Feb. 21, | 1928 |
| 1,685,792 | Warren | Oct. 2, | 1928 |
| 1,748,309 | Rose | Feb. 25, | 1930 |
| 1,810,718 | Lord | June 16, | 1931 |
| 1,981,655 | Lucke | Nov. 20, | 1934 |
| 2,098,460 | McWhirter | Nov. 9, | 1937 |
| 2,101,024 | Heinze | Dec. 7, | 1937 |
| 2,468,158 | Bartholomew | Apr. 26, | 1949 |
| 2,582,002 | Candlin | Jan. 8, | 1952 |